US010712720B2

(12) United States Patent
Ogden (10) Patent No.: US 10,712,720 B2
(45) Date of Patent: *Jul. 14, 2020

(54) SEISMIC EVENT RESPONSIVE ALERT AND UTILITIES CONTROL SYSTEM HAVING A UTILITIES CONTROL UNIT

(71) Applicant: E-Seismic Solutions, LLC, Ponte Vedra Beach, FL (US)

(72) Inventor: Everett Ogden, Ponte Vedra Beach, FL (US)

(73) Assignee: E-SEISMIC SOLUTIONS, LLC, Ponte Vedra Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,932

(22) Filed: Apr. 13, 2018

(65) Prior Publication Data

US 2018/0329377 A1 Nov. 15, 2018

Related U.S. Application Data

(63) Continuation-in-part of application No. 15/918,602, filed on Mar. 12, 2018, now abandoned, which is a
(Continued)

(51) Int. Cl.
*G05B 15/00* (2006.01)
*G05B 15/02* (2006.01)
(Continued)

(52) U.S. Cl.
CPC ............ *G05B 15/02* (2013.01); *G01V 1/008* (2013.01); *G01V 1/22* (2013.01); *G01M 3/00* (2013.01); *G06Q 50/265* (2013.01)

(58) Field of Classification Search
None
See application file for complete search history.

(56) References Cited

U.S. PATENT DOCUMENTS

5,412,616 A * 5/1995 Gonzalez ........... G05D 16/2013
367/13
6,414,601 B1 * 7/2002 Massedonio ........... G08B 21/10
340/690
(Continued)

*Primary Examiner* — Paul B Yanchus, III
(74) *Attorney, Agent, or Firm* — Thomas C. Saitta (57) ABSTRACT

A system adapted to provide alert signals to individuals or institutions and/or control signals to utilities control units to automatically stop the flow of gas, water, electricity, oil, etc., such signals being delivered in response to the detection of seismic events, the detection occurring via ground-based monitoring systems and/or satellite-based monitoring systems. The alert and/or control signals are distributed through various broadcasting systems or similar channels of communication, such as radio frequency transmitters, Internet service providers, cell phone wireless carriers, satellite phone service providers and/or security monitoring service providers, to individuals and/or facilities through smartphones, landline telephones, tablets, PC's, voice-controlled web communication devices or the like and/or to signal receivers on utilities control units. The system utilizes utilities control units having a signal receiving device adapted to receive the alert and utilities control signals from the broadcasting systems, and a central processing unit module in communication with the signal receiving device and one or more utilities control mechanisms.

12 Claims, 7 Drawing Sheets

Related U.S. Application Data continuation-in-part of application No. 15/893,984, filed on Feb. 12, 2018.

(60) Provisional application No. 62/504,961, filed on May 11, 2017, provisional application No. 62/569,925, filed on Oct. 9, 2017.

(51) Int. Cl.
| | | |
|---|---|---|
| *G01V 1/22* | (2006.01) | |
| *G01V 1/00* | (2006.01) | |
| G01M 3/00 | (2006.01) | |
| G06Q 50/26 | (2012.01) | |

(56) References Cited

U.S. PATENT DOCUMENTS

| | | |
|---|---|---|
| 8,824,996 B2 | 9/2014 | Andersen et al. |
| 9,182,052 B2 | 11/2015 | Scott et al. |
| 9,251,687 B2 | 2/2016 | Thompson et al. |
| 9,261,204 B2 | 2/2016 | Scott et al. |
| 2001/0047227 A1* | 11/2001 | Baraty .................. G08B 21/10 700/275 |
| 2002/0170595 A1 | 11/2002 | Oliver |
| 2004/0149334 A1 | 8/2004 | McGill et al. |
| 2011/0220207 A1 | 9/2011 | Bronner |
| 2012/0056711 A1* | 3/2012 | Hanrahan ................ G05B 9/02 340/3.4 |
| 2012/0274440 A1 | 11/2012 | Meadows et al. |
| 2016/0203697 A1* | 7/2016 | Lu .......................... G08B 21/10 340/690 |
| 2016/0370478 A1* | 12/2016 | Ouzounov ............. G01V 1/008 |
| 2017/0111712 A1* | 4/2017 | Demosthenous ........ H04Q 9/00 |

\* cited by examiner

SEISMIC EVENT RESPONSIVE ALERT AND UTILITIES CONTROL SYSTEM HAVING A UTILITIES CONTROL UNIT

This application is a continuation-in-part of U.S. patent application Ser. No. 15/918,602, which is a continuation-in-part of U.S. patent application Ser. No. 15/893,984, filed Feb. 12, 2018, which application claims the benefit of U.S. Provisional Patent Application Ser. No. 62/504,961, filed May 11, 2017, titled Seismic Responsive Utilities Control System, and U.S. Provisional Patent Application Ser. No. 62/569,925, filed Oct. 9, 2017, titled Seismic Responsive Municipalities Monitoring Water Gas Electronic Sensor and Valve, the disclosures of which are incorporated herein by reference.

BACKGROUND OF THE INVENTION

This application relates generally to the field of systems, devices and methods that provide alerts in response to seismic events and/or systems and devices that control utilities, such as water or gas pipelines, in response to seismic events.

Seismic events, i.e., earthquakes, vary in strength and damage depending on the magnitude of the seismic event, the distance from the event, the type of terrain, etc., such that the seismic event may result in little or no damage to life and infrastructure (buildings, roads, utilities, etc.) or may result in massive and widespread damage and loss of life. The damage may result from direct shock and tremor effects, such as building collapse, or from secondary dangers, such as gas explosions, fires or flooding. Rapid and widespread warnings upon the occurrence of a seismic event may reduce loss of life and secondary damage to infrastructure. The most common known seismic event monitoring systems rely upon physical sensor devices that react to tremors or shock-waves produced by an active seismic event. Such devices may be as simple as pedestal switches, mercury switches, tilt switches or the like that are affected by physical vibrations, or may be more complicated devices involving integrated circuits on electronic microchips, microprocessors or the like also affected by physical vibrations.

One way to mitigate secondary damage to structures is to cut off gas, water and/or electrical flow when a seismic event occurs. Manual control of utilities by homeowners and business owners is a possible way to address this, but it is unlikely that such actions will be undertaken upon the occurrence of a seismic event, given that personal safety will be the paramount motivating factor for any action and that the time from a warning alert to experiencing the damage from the seismic event may be only a matter of seconds. In view of this, California, the state most prone to seismic events, has promulgated regulations requiring homes and businesses to have automatic cutoff valves for gas pipelines that are responsive to seismic events. Similar devices are known for automatically cutting off the delivery of water and electricity as well. The devices are typically vibration sensitive such that they respond to physical effects, i.e., tremors or shock waves. It has proven difficult to design such devices which are able to distinguish between actual seismic events versus false positives caused by sonic booms, truck traffic, building construction, etc., meaning that the threshold sensitivity of the devices must be set artificially high to avoid the false positives.

Strong ground tremors from an earthquake travel at about 2 miles per second, so it is possible to detect a large earthquake near its source and broadcast a warning of imminent strong tremors to more distant areas before the tremors arrive. Systems known as Early Earthquake Warning (EEW) systems are known. Such EEW systems are operational in several countries around the world, including Mexico, Japan, Turkey, Romania, China, Italy, and Taiwan. The (USGS) operates such an earthquake monitoring and warning system which initiates the broadcast of Wireless Emergency Alerts (WEA) upon the occurrence of a seismic event.

Since 2006 the United States Geological Service (USGS) has been developing EEW and WEA systems for the United States, with the help of several cooperating organizations including the California Geological Survey (CGS), the California Institute of Technology (Caltech), the California Office of Emergency Services (CalOES), the Moore Foundation, the University of California, Berkeley, the University of Washington, and the University of Oregon. The goal is to provide an effective EEW system for the highest risk areas of the United States, beginning with the West Coast states: California, Washington, and Oregon.

These current systems can only detect and provide warning alerts and/or control utilities flow simultaneously or shortly after the occurrence of the seismic event. Recently a reliable system for monitoring and predicting seismic events has been developed whereby early, non-physical seismic signals detected by satellites are used to provide earlier notice of a seismic event. Rapid movement of the Earth's crust generates electromagnetic radiation which disrupts or alters electromagnetic fields, ionosphere plasma and high-energy particles. These effects, sometimes referred to as lithosphere-atmosphere-ionosphere (LAI) coupling effects, can be sensed prior to the time that the crust movement produces the actual surface level tremor or shock. Such satellite-based systems have been shown to detect the dangerous seismic event as much as several hours prior to its effective occurrence on the surface. By detecting these electromagnetic signals, warning alerts and/or utilities flow control signals can be initiated by a satellite-based system much sooner than with the known ground-based systems.

It is an object of this invention to provide a seismic alert and utilities control system and methodology that is both responsive to ground-based physical detection of seismic events as well as predictive, in the sense of satellite-based detection of electromagnetically-produced signals which occur prior to any physical effects being detectable by ground-based physical sensors. It is a further object to provide such a system and methodology that utilizes a combination of ground-based and satellite-based seismic event monitoring systems. It is a further object to provide such a system and methodology that optimizes delivery of warning alerts and/or utilities control signals, both in terms of controlled broadcast distribution to affected regions and in terms of providing multiple, redundant alert distribution systems. It is a further object to provide such a system and methodology that incorporates differing and/or redundant triggering and sensing systems for distribution of alerts and utilities control actuations. It is a further object to provide such a system and methodology that optimizes the ability of utilities providers and utilities users to return the utilities to operational status after the seismic event. It is a further object to provide such a system and methodology able to transmit data to utilities providers, facilities operators and other users indicating post-seismic-event status or condition. It is a further object to provide such a system having a dedicated software interface for smartphones, tablets or personal computers providing operational control and information to the user. It is a further object to provide utilities control units associated with utilities metering devices, and/or utilities control mechanisms responsive to utilities control units, the utilities control mechanisms comprising valves, switches, breakers or the like which may be incorporated in or associated with the metering devices, in the same or separated housings or locations relative to a particular utilities system.

SUMMARY OF THE INVENTION

In a broad embodiment, the invention is a system adapted to provide alert signals to individuals or institutions and/or control signals to utilities control units to automatically stop the flow of gas, water, electricity, oil, etc., such signals being delivered in response to the detection of seismic events, the detection occurring via ground-based monitoring systems, which for example employ physically responsive sensors which detect tremors or shock waves, such as vibration sensors, as well as other sensors to detect geological, surface and near-surface effects produced by the seismic event which occur at or near the surface, in combination with satellite-based monitoring systems, which for example employ sensors which detect LAI effects created by the seismic events, such as for example electromagnetic radiation disruption or alteration of electromagnetic fields, ionosphere plasma and high-energy particles, which are detectable in the upper atmosphere. The alert and/or control signals are distributed through various broadcasting systems or similar channels of communication, such as television or radio frequency transmitters, Internet service providers, cell phone wireless carriers, satellite phone service providers and/or security monitoring service providers, to individuals and/or facilities through signal receivers such as smartphones, landline telephones, tablets, PC's, voice-controlled web communication devices or the like and/or to signal receivers incorporated in or in direct communication with utilities control units which operate utilities control mechanisms. The utilities control units and/or utilities control mechanisms may also be directly activated by manual control or by dedicated physically responsive sensors. The electromagnetic seismic event effects are detected by the satellites a short time prior to detection of the physical seismic event signals by the ground-based systems, such the high atmospheric effects may be deemed to be in a sense predictive of impending surface tremors, shock waves or the like that may result in damage to the infrastructure and endangerment of life. The mass distribution of alert and/or control signals is preferably limited to the likely zone of danger, and may be based for example on zip codes or addresses, GPS-defined zones, cell tower groupings, or the like. Various embodiments for utilities control units and utilities control mechanisms, such as flow control valves, are contemplated. The utilities control units may be associated directly with utilities metering devices, particularly those metering devices having wireless communication capability, wherein the utilities control mechanisms may be remotely associated with the metering devices or incorporated within the structure or housing of the metering devices. In a preferred embodiment, the utilities control units or the utilities control mechanisms are provided with sensing systems to detect post-seismic problems or dangerous conditions, such as gas leaks for example, the sensing systems adapted to preclude reactivation of the utilities control mechanisms until the post-seismic problems have been properly addressed.

Alternatively expressed, the invention in various embodiments is a seismic event responsive alert and utilities control system comprising: a ground-based physical seismic event monitoring system adapted to detect physical seismic effects produced by a seismic event; a satellite-based atmospheric seismic event monitoring system adapted to detect atmospheric seismic effects produced by a seismic event; a data analysis processor system adapted to interpret information received from either or both of said ground-based physical seismic event monitoring system and said satellite-based atmospheric seismic event monitoring system, determine the likelihood of potential surface damage resulting from said seismic event, determine the likely region to be adversely affected by the seismic event, and initiate an immediate alert protocol whereby alert and utilities control signals are distributed to one or more broadcasting systems; one or more broadcasting systems adapted to deliver said alert and utilities control signals to signal receivers; signal receivers to receive said alert and utilities control signals, said signal receivers comprising utilities control units adapted to control utilities control mechanisms; and utilities control mechanisms adapted to stop the flow of utilities; whereby upon detection of a seismic effect created by a seismic event by at least one of said ground-based physical seismic event monitoring system and said satellite-based atmospheric seismic event monitoring system, alert and utilities control signals are initiated and delivered through said one or more broadcasting systems to said signal receivers such that the flow of utilities is stopped by said utilities control mechanisms. The embodiments further wherein said physical seismic effects comprise geological, surface and near-surface effects produced by the seismic event; wherein said atmospheric seismic effects comprise high atmospheric LAI effects which are not detectable by said ground-based physical seismic event monitoring system; wherein said LAI effects comprise electromagnetic radiation disrupting or altering electromagnetic fields, ionosphere plasma and high-energy particles; wherein said one or more broadcasting systems comprise one or more of the group of broadcasting systems consisting of Internet service providers, cell phone wireless carriers, satellite phone service providers, commercial or residential monitoring service providers, radio frequency transmitters or stations, and public service warning systems; wherein said signals receivers further comprise one or more of the group of signal receivers consisting of smartphones, tablets, PC's, landline telephones, satellite telephones and voice-controlled web communication devices; wherein said utilities control mechanisms stop the flow of one or more utilities chosen from the group of utilities consisting of gas, water, electricity and oil; wherein said utilities control mechanisms or said utilities control units comprise detection systems and transmission systems, said detection systems being adapted to detect dangerous conditions after said seismic event has concluded, and said transmission systems being adapted to transmit a warning signal upon the detection of a dangerous condition; and/or wherein said transmission systems transmit said warning signal to one or more of the entities chosen from the group of entities consisting of utility companies, security monitoring service providers, and facilities control.

Alternatively, a seismic event responsive alert and utilities control system comprising: a ground-based physical seismic event monitoring system adapted to detect physical seismic effects produced by a seismic event, wherein said physical seismic effects comprise geological, surface and near-surface effects produced by the seismic event; a satellite-based atmospheric seismic event monitoring system adapted to detect atmospheric seismic effects produced by a seismic event, wherein said atmospheric seismic effects comprise high atmospheric LAI effects which are not detectable by said ground-based physical seismic event monitoring system; a data analysis processor system adapted to interpret information received from either or both of said ground-based physical seismic event monitoring system and said satellite-based atmospheric seismic event monitoring system, determine the likelihood of potential surface damage resulting from said seismic event, determine the likely region to be adversely affected by the seismic event, and initiate an immediate alert protocol whereby alert and utilities control signals are distributed to one or more broadcasting systems; one or more broadcasting systems adapted to deliver said alert and utilities control signals to signal receivers, wherein said one or more broadcasting systems comprise one or more of the group of broadcasting systems consisting of Internet service providers, cell phone wireless carriers, satellite phone service providers, commercial or residential monitoring service providers, radio frequency transmitters or stations, and public service warning systems; signal receivers to receive said alert and utilities control signals, said signal receivers comprising utilities control units adapted to control utilities control mechanisms, wherein said signals receivers further comprise one or more of the group of signal receivers consisting of smartphones, tablets, PC's, landline telephones, satellite telephones and voice-controlled web communication devices; and utilities control mechanisms adapted to stop the flow of utilities, wherein said utilities control mechanisms stop the flow of one or more utilities chosen from the group of utilities consisting of gas, water, electricity and oil; whereby upon detection of a seismic effect created by a seismic event by at least one of said ground-based physical seismic event monitoring system and said satellite-based atmospheric seismic event monitoring system, alert and utilities control signals are initiated and delivered through said one or more broadcasting systems to said signal receivers such that the flow of utilities is stopped by said utilities control mechanisms. Still further, wherein said utilities control mechanisms or said utilities control units comprise detection systems and transmission systems, said detection systems being adapted to detect dangerous conditions after said seismic event has concluded, and said transmission systems being adapted to transmit a warning signal upon the detection of a dangerous condition; and/or wherein said transmission systems transmit said warning signal to one or more of the entities chosen from the group of entities consisting of utility companies, security monitoring service providers, and facilities control.

Alternatively, the invention is a seismic event responsive alert and utilities control system comprising one or more broadcasting systems, one or more utilities control units, and one or more utilities control mechanisms; said one or more broadcasting systems adapted to deliver alert and utilities control signals to said one or more utilities control units in response to a seismic event, said one or more utilities control units adapted to control said one or more utilities control mechanisms; and said one or more utilities control mechanisms adapted to stop the flow of utilities; wherein said one or more utilities control units each comprise one or more signal receiving devices adapted to receive said alert and utilities control signals from said one or more broadcasting systems, and a central processing unit module in communication with said one or more signal receiving devices and said one or more utilities control mechanisms; such that upon receipt of said alert and utilities control signals said one or more signal receiving devices communicate said alert and utilities control signal to said central processing unit module, and said central processing unit module initiates an actuation signal to said one or more utilities control mechanisms, thereby stopping the flow of utilities. Still further, said one or more utilities control units further comprising a physical vibration sensor in communication with said central processing unit module, such that upon sensing vibrations from a seismic event, said physical vibration sensor delivers a signal to said central processing unit module, and said central processing unit module initiates an actuation signal to said one or more utilities control mechanisms, thereby stopping the flow of utilities; further comprising a valve connection interface, said valve connection interface being in communication with said central processing unit module and said one or more utilities control mechanisms; each said one or more utilities control units further comprising a battery adapted to provide power to each said one or more utilities control units; each said one or more utilities control units further comprising one or more visual indicators; each said one or more utilities control units further comprising a transmitter device in communication with said central processing unit module, said transmitter device adapted to deliver status and other information to receivers; wherein said one or more signal receiving devices are adapted to receive one or more radio frequency signals, cell phone signals, internet signals and Bluetooth signals; further comprising a valve connection interface, said valve connection interface being in communication with said central processing unit module and said one or more utilities control mechanisms; each said one or more utilities control units further comprising a battery adapted to provide power to each said one or more utilities control units; each said one or more utilities control units further comprising one or more visual indicators; each said one or more utilities control units further comprising a transmitter device in communication with said central processing unit module, said transmitter device adapted to deliver status and other information to receivers; and wherein said one or more signal receiving devices are adapted to receive one or more radio frequency signals, cell phone signals, internet signals and Bluetooth signals; said one or more utilities control mechanisms further comprising: a gas leak sensor in communication with said one or more utilities control units, said gas leak sensor adapted to provide a signal to said one or more utilities control units when a gas leak is detected; said one or more utilities control mechanisms further comprising: a valve actuator adapted to close a valve to stop the flow of utilities; whereby upon receipt of said actuation signal from said utilities control unit, said valve actuator stops the flow of utilities; said one or more utilities control mechanisms further comprising: an actuator control relay in communication with said one or more utilities control unit and said valve actuator; and a valve status sensor system adapted to provide a valve status signal to said one or more utilities control units; said one or more utilities control mechanisms further comprising: a motor controller adapted to operate said valve actuator; and a current sense shunt and shunt comparator adapted to measure the current peak in said motor controller and provide a motor signal to said one or more utilities control units; and/or said one or more utilities control mechanisms further comprising: an actuator switch in communication with said one or more utilities control unit and said valve actuator; and a position sense relay in communication with said valve actuator and said one or more utilities control units.

DETAILED DESCRIPTION OF THE INVENTION

In general, the invention is a seismic event responsive alert and utilities control system, which in a preferred embodiment comprises one or more ground-based physical seismic event monitoring systems and one or more satellite-based atmospheric seismic event monitoring systems. As used herein, the term "seismic event" shall refer to a geological event resulting from the shifting of plates under the surface or underground volcanic forces, commonly referred to as earthquakes, that typically result in damaging surface effects to infrastructure and danger to life. The temi "physical seismic effect" shall refer to geological, surface and near-surface effects produced by the seismic event which occur at or near the surface, such as tremors or shock waves, as well as low-atmosphere effects. The term "atmospheric seismic effect" shall refer to high atmospheric LAI effects produced by the seismic events, such as for example electromagnetic radiation disrupting or altering electromagnetic fields, ionosphere plasma and high-energy particles, which are detectable in the upper atmosphere by satellites. The term "ground-based physical seismic event monitoring system" shall refer to systems, facilities or devices located on or at the earth's surface that detect physical seismic effects. The term "satellite-based atmospheric seismic event monitoring system" shall refer to orbiting satellite systems or devices that detect high altitude atmospheric seismic effects, and in particular detect high altitude atmospheric seismic effects not detectable by ground-based physical seismic event monitoring systems, which may be due in part to telecommunication jamming frequencies or atmospheric pollution.

Figure 1:
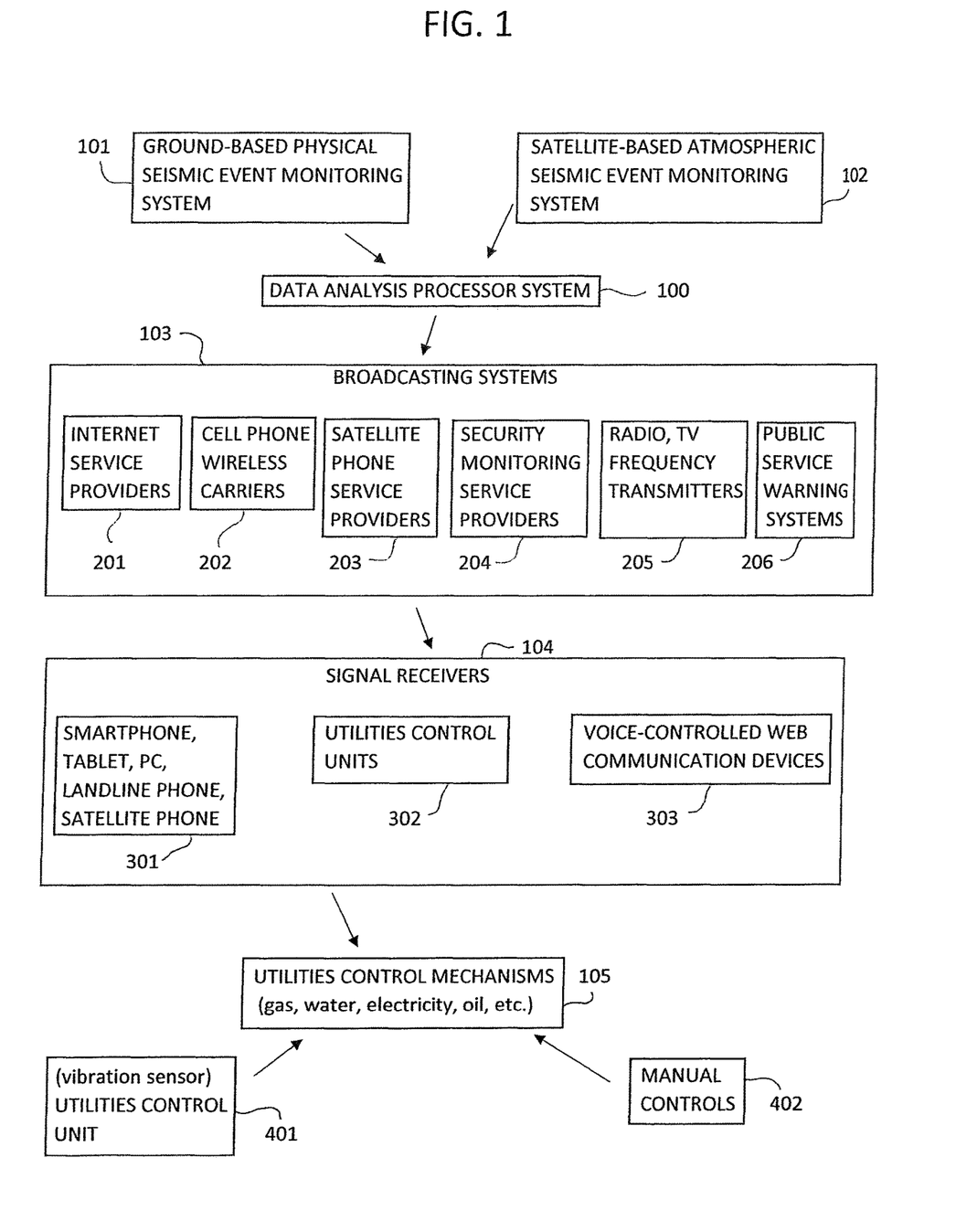
FIG. 1 is an overview illustration of the various elements of the system showing the various pathways for the delivery of alert and control signals to individuals, signal receiving devices and utilities control units.

FIG. 1 illustrates a preferred embodiment of the seismic event responsive alert and utilities control system wherein complementary ground-based physical seismic event monitoring systems 101 and satellite-based atmospheric seismic event monitoring systems 102 are utilized to detect seismic events. Upon detection of the seismic event by either the ground-based physical seismic event monitoring systems 101 or satellite-based atmospheric seismic event monitoring systems 102, a data analysis processor system 100 incorporating computer processing systems operated by appropriate software interprets information received from either or both the ground-based physical seismic event monitoring systems 101 and satellite-based atmospheric seismic event monitoring systems 102, determines there is a high likelihood of potential surface damage resulting from the seismic event, determines the likely region to be adversely affected by the seismic event and initiates an immediate alert protocol, based on pre-established channels of communication, whereby alert and utilities control signals are sent out over a broadcasting system 103 capable of reaching a large number of signal receivers 104, and which preferably includes multiple signal carrier systems, such as for example Internet service providers 201, cell phone wireless carriers 202, satellite phone service providers 203 business or residential security monitoring service providers 204, radio or television frequency transmitters 205 and/or public service warning systems 206, such as the USGS WEA system. The ground-based physical seismic event monitoring systems 101 and satellite-based atmospheric seismic event monitoring systems 102 may comprise dedicated or separate ground-based data analysis processor systems 100, the ground-based physical seismic event monitoring systems 101 and satellite-based atmospheric seismic event monitoring systems 102 may each comprise internal data analysis processor systems 100, or one of the broadcasting systems 103, such as for example the USGS WEA system, may comprise a data analysis processor system 100 which receives the seismic data and distributes the alert and utilities control signals to other broadcasting systems 104 in addition to transmitting the alert and utilities control signals to its signal receivers 104.

The alert and utilities control signals are immediately and simultaneously distributed to multiple signal receivers 104 within the area determined to be likely to be affected by the seismic event. For example, wide-spread or blast alert signals may be sent by Verizon to all individuals having a Verizon cell phone account whose mobile phone is determined to be within the region of expected danger, e.g., five miles from the expected epicenter of the seismic event, as well as sending utilities control signals to signal receivers 104 associated with utilities control units 302. Likewise, Comcast may send alert and control signals to all Comcast computer accounts or Internet-connected utilities control units 302 within the region. The alert and control signals may also be sent directly to pre-determined localized institutional recipients, such as governmental entities, schools, hospitals, universities, large industrial sites, chemical manufacturing plants, etc. Signal receivers 104 may include for example landline telephones, personal smartphones, satellite phones, tablets or PC's 301, utilities control units 302 that control the flow of utilities such as gas, water or electricity, and/or voice-controlled web communication devices 303, such as for example smart speakers sold under the brand names ECHO DOT or GOOGLE HOME. The signals may be distributed over radio, television, wifi, the Internet, or any other suitable broadcasting medium, in the form of voice recordings, text messages, instant messages, app alerts, etc. The utilities control units 302 may have multiple receiver systems, i.e. cell or radio antennas, wifi receivers, hardwire phone lines, etc., such that a primary or dedicated signal type may be chosen (e.g., cell signal) or such that the utilities control units may have redundant active receiver systems (e.g., cell signal, radio signal and wifi), any of which are active to receive the utilities control signal.

Ground-based physical seismic events monitoring systems 101 are known and at a minimum detect the basic physical seismic effects, such as tremors or shock waves, using traditional physical seismic effect sensors, such as for example sensors triggered by excessive vibrations. The physical seismic effect sensors may be electronically sophisticated devices, such as for example an OMRON integrated circuit chip, or may be as simple as pedestal-type sensors where a physical object falls or unseats due to the seismic vibrations. These systems may also comprise the ability to detect other ground or low atmosphere physical seismic effects, such as charged aerosols, radioactivity, gas composition, DC electric fields and conductivity, and VHF broadcast radiation, as well as probing the ionosphere by ULF/ELF/VLF/LF waves. For example, the United States Geological Service (USGS) 206 operates a ground-based physical seismic events monitoring system 101 which broadcasts Wireless Emergency Alerts (WEA) in text form to wireless phones and other enabled mobile devices within a geographically determined area alerting the users of an imminent seismic threat. For example, once a danger area is determined, alert signals may be transmitted only through a restricted number of cell towers located within or near the danger area. Other public safety alerts such as weather, terrorist, chemical spill or like emergencies may be distributed by other governmental authorities over this WEA system.

Satellite-based atmospheric seismic event monitoring systems 102 are relatively new. Such systems utilize earth orbiting satellites to sense high altitude atmospheric seismic effects caused by natural geophysical activity, effects which are not detectable by ground-based seismic event monitoring systems 101. The sensors detect electromagnetic emissions over a large frequency range, ULF/ELF/VHF emissions, perturbations of ionospheric layers, anomalies in VLF transmitter signals, DC electric fields, and/or even nightglow observations. The atmospheric seismic effects can often be detected up to 30 seconds, and sometimes as much as several hours, prior to the occurrence of the physical seismic effects and can therefore be used as predictive or early warning indicators of possible near-future seismic events. Not all seismic events produce atmospheric seismic effects, so maximum protection is provided by combining the satellite-based atmospheric seismic event monitoring systems 102 with the ground-based physical seismic events monitoring systems 101.

The efficacy of the system resides in the ability of the broadcasting system 103 to immediately provide alert and control signals to the particular geographical region expected to be affected by the seismic event, with the signals being broadcast most preferably over multiple and varied signal providers, carriers, etc., so as to reach as many people, agencies, institutions and the like as possible. Thus for example, the broadcasting system 103 preferably comprises a combination of all or some of Internet service providers 201, cell phone wireless carriers 202, satellite phone service providers 203, commercial or residential monitoring service providers 204, radio frequency transmitters or stations 205, and public service warning systems 206, which in turn deliver the alert and control signals to various signal receivers 104. Examples of providers in the broadcasting system 103 include Verizon, AT&T, Comcast, Google, Microsoft, ADT Security Services, USGS WEA, etc. The signal receivers 104 may include landline telephones, smartphones, satellite phones, tablets or PC's 301, utilities control units 302, and/or voice-controlled web communication devices 303, or any similar devices adapted to receive messages or activation signals via radio frequency, landline, cell tower, wifi, Bluetooth, etc.

An important component of the seismic event responsive alert and utilities control system is the ability to immediately stop the flow of utilities, such as gas, water, oil and electricity, in order to minimize secondary damage, such as fire, explosions, flooding, etc., resulting from a major seismic event. Thus, the signal receivers 104 of the seismic alert and utilities control system comprise utilities control units 302 that are adapted to actuate one or more dedicated utilities control mechanisms 105. The dedicated utilities control mechanisms 105 include gas valves, oil valves, water valves, electrical switches or the like which shut off the flow utilities. Upon receipt of a control signal from the broadcasting system 103 indicating that a seismic event is imminent or occurring, the utilities control unit 302 activates the utilities control mechanisms 105 to stop delivery of the gas, water, oil and electricity through the utility system. A single utilities control unit 302 may operate a single utilities control mechanism 105, but preferably a single utilities control unit 302 will control multiple utilities control mechanisms 105. In this sense the utilities control unit 302 is a communications hub connected to a plurality of nodes. The actuation communication may occur through direct hardwired circuitry, or may be accomplished via radio transmission, wifi, Bluetooth or similar means.

The utilities control units 302 or utilities control mechanisms 105 may be provided with or used in conjunction with redundant actuation mechanisms or systems. For example, the utilities control units 302 may be provided with both a system to receive the control signals from the broadcasting system 103 and a physical vibration sensor utilities control unit 401 adapted to actuate closure of the utilities control mechanisms 105. Furthermore, the utilities control units 302 or the utilities control mechanisms 105 could be activated by manual controls 402, and alternatively still, could be activated by user input commands from a signal receiver smartphone, tablet or PC 301. Because the time from signal broadcast to the occurrence of physical seismic events may be brief, automatic systems that require no user input or action are most preferred.

Because smartphones 301 are ubiquitous in today's world, a preferred embodiment of the seismic event responsive alert and utilities control system comprises a broadcasting system 103 that includes a cell phone wireless carrier 202, as in most circumstances this is the optimal manner with which to distribute the alert and utilities control signals to the largest number of people and devices within the affected geographical region.

In an even more preferred system, the broadcasting system 103 includes both a cell phone wireless carrier 202 and to security monitoring service provider 204, such as for example ADT Security Services. Inclusion of the security monitoring service providers 204 is extremely beneficial in the implementation and establishment of the system, as the security monitoring service providers 204 provide an existing broadcasting system 103 with large numbers of signal receivers 104. The complete seismic event responsive alert and utilities control system can therefore be immediately implemented in earthquake prone areas having established security monitoring service providers 204. The security monitoring service providers 204 each provide a single source for immediate distribution of the alert signals. Furthermore, many security monitoring service providers 204 also incorporate device control systems capable of operating cameras, locks, fire suppression equipment, etc. The incorporation of utilities control units 302 and utilities control mechanisms 105 within their existing systems is therefore easily accomplished.

It is not uncommon, particularly in commercial facilities or residences set up to be "smart-homes", that electronically controlled non-communication devices will be present, such as for example cameras, fire alarms, automatic door locks, automatic garage doors, elevators, escalators, etc. Such devices may be provided with the equivalent of utilities control units 302, which may be referred to as facilities control units, such that the device may be deactivated (or activated) by the equivalent of a utilities control signal, a facilities control signal, provided by one of the broadcasting systems 103. In particular, a facility monitored by a security monitoring service provider 204 could transmit specific facilities control signals to deactivate elevators, lock or unlock doors, etc.

Figure 2:
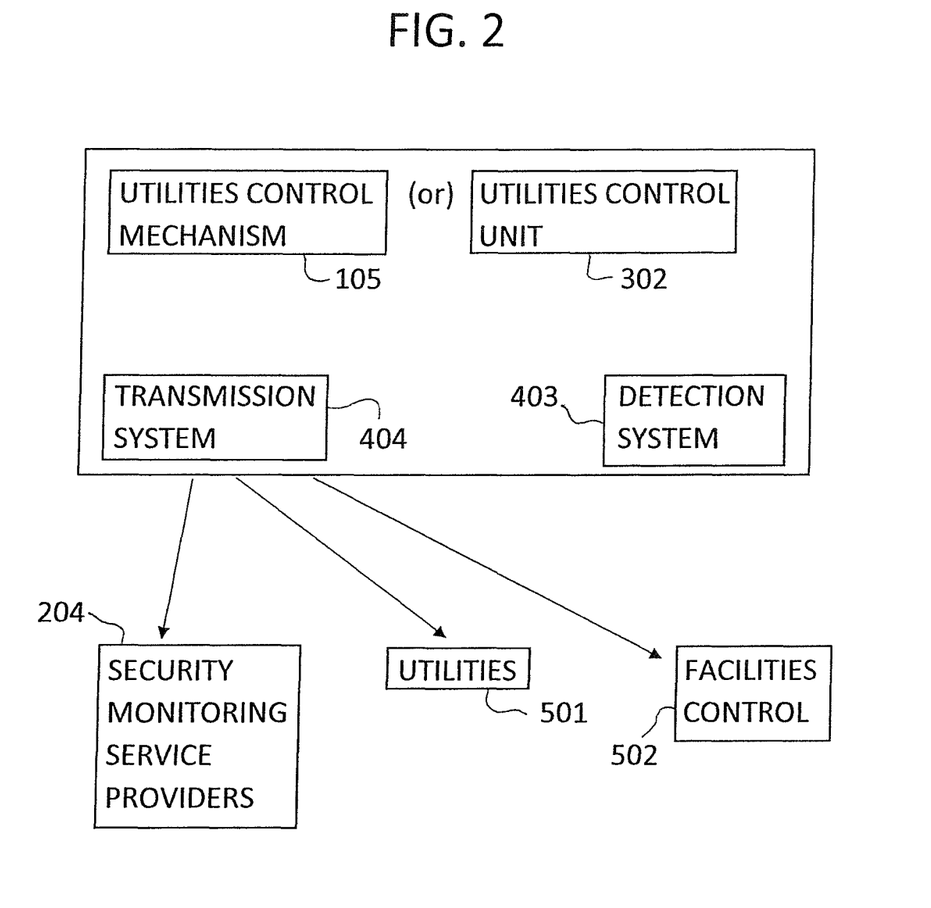
FIG. 2 is an illustration of an embodiment of a utilities control mechanism or utilities control unit having a detection system to detect leaks or other dangerous conditions present after the seismic event has occurred, and further having a transmission system to communicate the condition to various entities.

In still another embodiment, the utilities control unit 302 or utilities control mechanism 105 are adapted such that the valves, circuits, etc., may be opened remotely once the seismic event has passed to reinitiate the flow of utilities. Preferably a password or authentication code issued by the utilities provider is required prior to remote, or even localized, reactivation to ensure that reopening the valves, circuits, etc. is performed only after the situation is deemed safe. With such a system, it is preferred that the seismic event responsive alert and utilities control system further comprises utilities control units 302 or utilities control mechanisms 105 having detection or sensing systems, devices or mechanisms 403 adapted to determine after the danger of the seismic event has passed whether it is safe to resume delivering utilities. For example, a utilities control unit 302 or utilities control mechanism 105 that is a gas flow valve may be provided with a gas detection or sniffing system 403 that can detect a gas leak when the gas flow is resumed. Similar detection systems 403 may be provided for water, oil and electric lines to indicate and alert when there are dangerous conditions present. In a basic embodiment the utilities control units 302 or utilities control mechanisms 105 may provide a visible indicator signal and/or preclude reopening of the utilities valve, circuit or shut off mechanism until examined by a technician.

In a more preferred embodiment, the utilities control units 302 or utilities control mechanisms 105 are also provided with transmission systems 404 with appropriate processor or integrated circuit systems adapted to communicate a warning signal indicating the existence of a dangerous condition (or lack of) to the appropriate entities for action (utility companies 501, security monitoring service providers 204, facilities operators or control systems 502 at hospitals, schools, chemical manufacturing plants, etc.), such as halting the flow of the utilities, sending repair crews, evacuating buildings, etc. The transmission systems 404 may deliver the information in any known manner (hardwire, landline, wife, Bluetooth, radio, etc.). The sensing systems 403 may also serve the additional purpose of continuously monitoring the utilities, such that a dangerous condition occurring in the future, for example a gas leak, can be reported and addressed.

For utilities distribution facilities, such as gas supply depots, electrical production facilities, water supply facilities, the utilities control units 302 or utilities control mechanisms 105 will be installed on the large-volume delivery pipelines, grids or conduits at the facilities so that mass distribution of gas, electricity or water may be stopped at the source. Likewise, the utilities control units 302 or utilities control mechanisms 105 will be installed on site for utilities recipients or end-users (houses, commercial establishments, hospitals, apartments, factories, schools, etc.). In this manner individual houses, building, facilities and the like having localized damage to the utilities are independently protected once mass distribution of utilities resumes.

There are currently millions of standard utilities control mechanisms in use wherein the status condition of the valve (i.e., open or closed) is controlled manually or by an electrical signal received from a standard control unit that is manually actuated, e.g., turning a switch. Therefore, one scenario for implementation of the system is through retrofitting the existing utilities control mechanisms and control units to convert them into utilities control units 302 or utilities control mechanisms 105 as described herein and which are then suitable for incorporation into the seismic event responsive alert and utilities control system. This is accomplished by providing a communications module that is interconnected to the standard control unit of the standard utilities control mechanism, or directly to the standard utilities control mechanism. The communications module is adapted to receive the utilities control signals from the broadcasting system 103 and send an operational signal to the standard control unit, thereby triggering closure of the utilities control mechanism. The communications module is hardwired to the standard utilities control unit such that closure is triggered by receipt of a utilities control signal in the same manner as if the device was manually activated. The standard utilities control unit or the standard utilities control mechanism now operating as a utilities control unit 302 or utilities control mechanism 105 may also be provided with a detection system 403 and a transmission system 404, constructed as part of the communications module, to provide the expanded capabilities of detecting and reporting dangerous conditions post-seismic event.

The seismic event responsive alert and utilities control system can be utilized to control large-scale utility or pipeline systems, such that rather than or in addition to controlling a large number of building specific utilities control mechanisms 105 receiving gas, water, electricity or oil from the large-scale utility or pipeline systems, entire electrical grids or miles of gas, water or oil pipelines can be shut down upon the occurrence of a seismic event.

In addition to controlling the flow of utilities upon the occurrence of a seismic event, the system may further be used with control mechanisms not connected to utilities. For example, any control mechanism that operates a mechanical system, such as an elevator, escalator, drawbridges, etc., could be incorporated into the seismic event responsive alert and utilities control system such that mechanical systems would be rendered inoperable, i.e., locked down, during the seismic event.

For signal receivers 104 that comprise smartphones, tablets, PC's or the like, a further embodiment would provide dedicated software apps or websites that include the ability for the user or installers to designate or pair with individual or multiple utilities control units 302, utilities control mechanisms 105, broadcasting systems 103, etc., thereby allowing for the customization of a seismic event responsive alert and utilities control system. The apps or websites can provide condition indicators, status checks, alternative warning systems sources, operational controls or the like. The apps or websites can provide direct communication means with security monitoring service providers 204.

Figure 3:
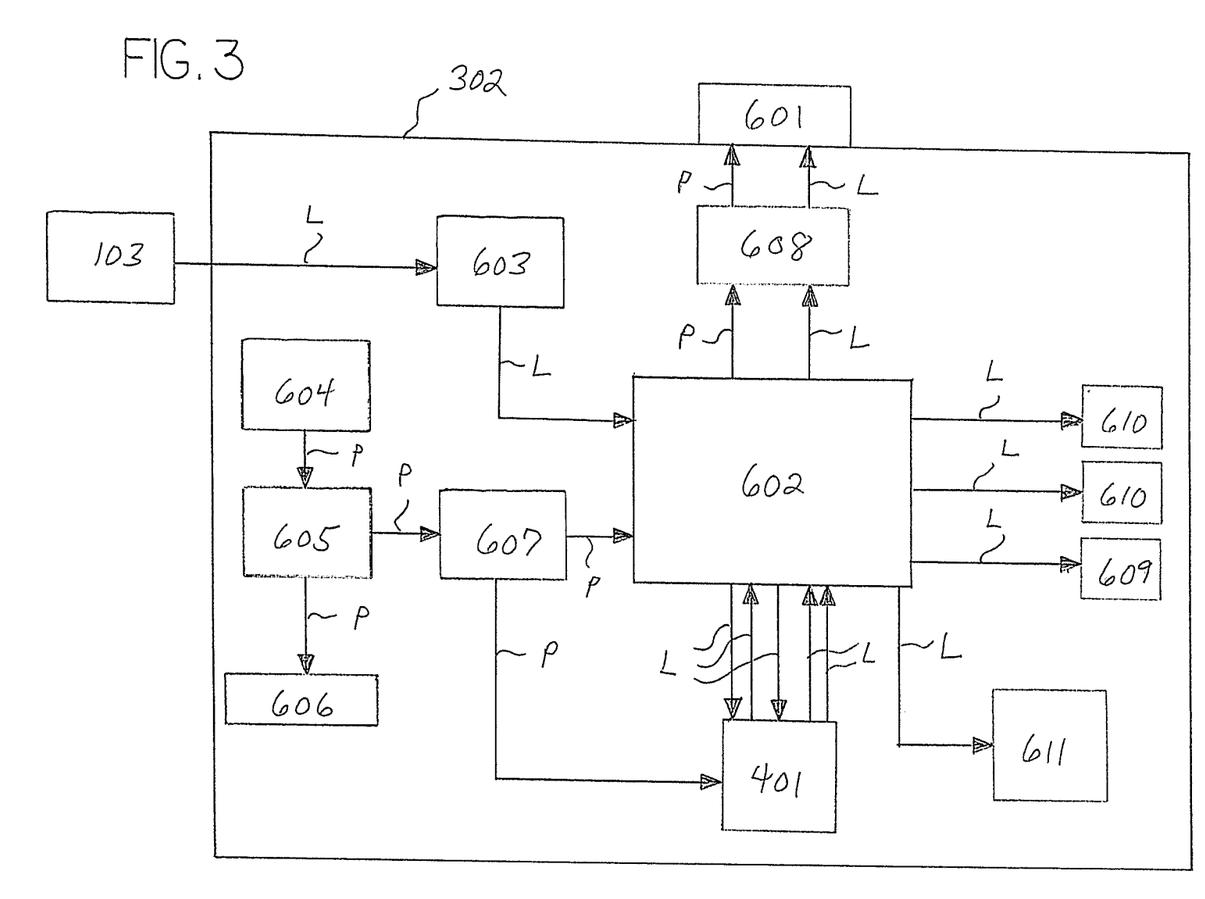
FIG. 3 illustrates an embodiment of a utilities control unit.

A representative embodiment of a utilities control unit 302 is illustrated schematically in FIG. 3. Power lines P supply electrical power. Logic lines L include signal transmission lines, general purpose digital input/output lines, serial clock lines, and serial data lines. As illustrated, the utilities control unit 302 is provided as a stand-alone unit that comprises a valve connection interface 601 adapted to interface with a utilities control mechanism 105. The valve connection interface 601 may comprise one half of a pintype docking interface, or alternatively may be hardwired to the utilities control mechanism externally or internally. The utilities control unit 302 may be adapted for communication with multiple utilities control mechanisms 105. The valve connection interface 601 of the utilities control unit 302 may be a wireless communication transmitter in communication with one or more utilities control mechanisms 105 which are provided with the appropriate wireless receiver units to receive the wireless communication.

The utilities control unit 302 further comprises a central processing unit (CPU) module 602, which receives the utilities control signals from one of the broadcasting systems 103 through one or more dedicated signal receiving devices 603 adapted to receive the utilities control signals in one or more formats or protocols. The utilities control signals may for example be radio frequency signals, cell phone signals, internet signals, Bluetooth signals or the like. The utilities control signals may also be delivered or relayed to the signal receiving device 603 from a smartphone. The CPU module 602 is preferably powered by a battery 604 controlled by a power switch 605, although AC power from the standard electrical grid may be utilized. A visual operational or charge status indicator 606 may be provided, such as an LED externally mounted to the housing for the utilities control unit 302, to inform that there is sufficient battery power and/or that the utilities control unit 302 is operational. The power in the embodiment shown is then delivered through a regulator 607 to the CPU module 602. The utilities control unit 302 is preferably provided with a physical vibration sensor utilities control unit 401, such as for example an OMRON D7S earthquake sensor module, as a redundant actuating means responsive to a seismic event. Power is delivered through the regulator 607 to this physical vibration sensor utilities control unit 401 as well. Upon recognition of a seismic event, the physical vibration sensor utilities control unit 401 communicates a signal to the CPU module 602. Upon receipt of the utilities control signal from one of the broadcasting systems 103 or the signal from the physical vibration sensor utilities control unit 401, the CPU module 602 initiates an actuating signal to the valve connection interface 601, preferably through a valve interface fly-back protection unit 608. The CPU module 602 also controls visual indicators 610, such as externally mounted LED's, to provide information of various conditions, such as for example whether the valve controlled by the utilities control mechanism 105 is open or closed, whether the battery of the utilities control mechanism 105 is sufficiently charged, whether a gas leak has been detected, etc. The utilities control unit 302 may also comprise a reset switch 609 operated manually or remotely. The utilities control unit 302 may also be provided with a transmitter device 611 to wirelessly deliver status and other information to receivers such as smartphones, tablets, PC's or the like maintained by individuals, security monitoring service providers, etc.

Figure 4:
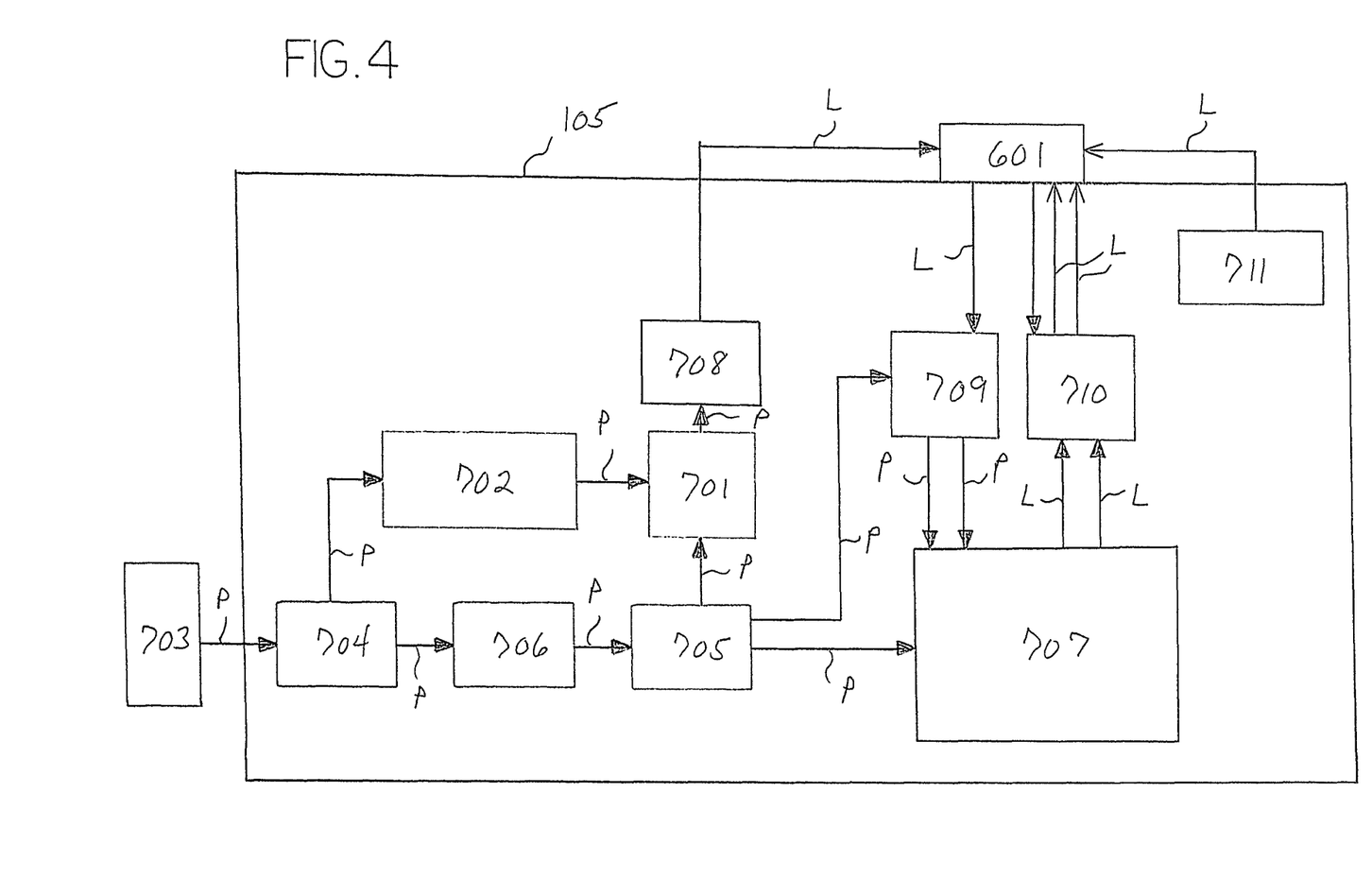
FIG. 4 illustrates an embodiment of a utilities control mechanism.

A representative example of a utilities control mechanism 105 adapted to operate in combination with the utilities control unit 302 of FIG. 3 is schematically illustrated in FIG. 4, which shows a modified Bi-Torq 12 VDC Valve Control Box. Power lines P supply electrical power. Logic lines L include signal transmission lines, general purpose digital input/output lines, a battery level flag line a gas leak flag line, valve control lines, valve status sensing lines, valve and status feedback lines. In this example, DC power is provided by a battery 701, which is charged by a charger 702 receiving power form an external AC power source 703, such as the standard electrical grid, delivered through standard operational components 704, such as a power switch, fuses, pilot light, etc. The power from the battery 701 is delivered through a backup relay 705 to a valve actuator 707 and to actuator control relays 709. Power to the backup relay 705 may also be provided by an AC to DC converter 706, which receives power from the AC input source 703. A battery charge sensor 708 provides a battery status signal to the utilities control unit 302 through the valve connection interface 601.

The actuator control relays 709, upon receipt of an actuation signal from the utilities control unit 302 that a seismic event is imminent or occurring, causes the valve actuator 707 to close the valve to stop the flow of utilities. The actuator control relays 709 also initiate reopening of the valve. A valve status sensor system 710, such as an opto-isolator circuit, senses the condition of the valve as either open or closed and provides a status signal to the utilities control unit 302 through the valve connection interface 601. In a preferred embodiment, the utilities control mechanism 105 is provided with a gas leak sensor 711 which sends a warning signal to the utilities control unit 302 through the valve connection interface 601. This warning signal may illuminate a visual indicator 610 on the utilities control unit 302, but is preferably relayed to control personnel through the transmitter system 611 of the utilities control unit 105.

Figure 5:
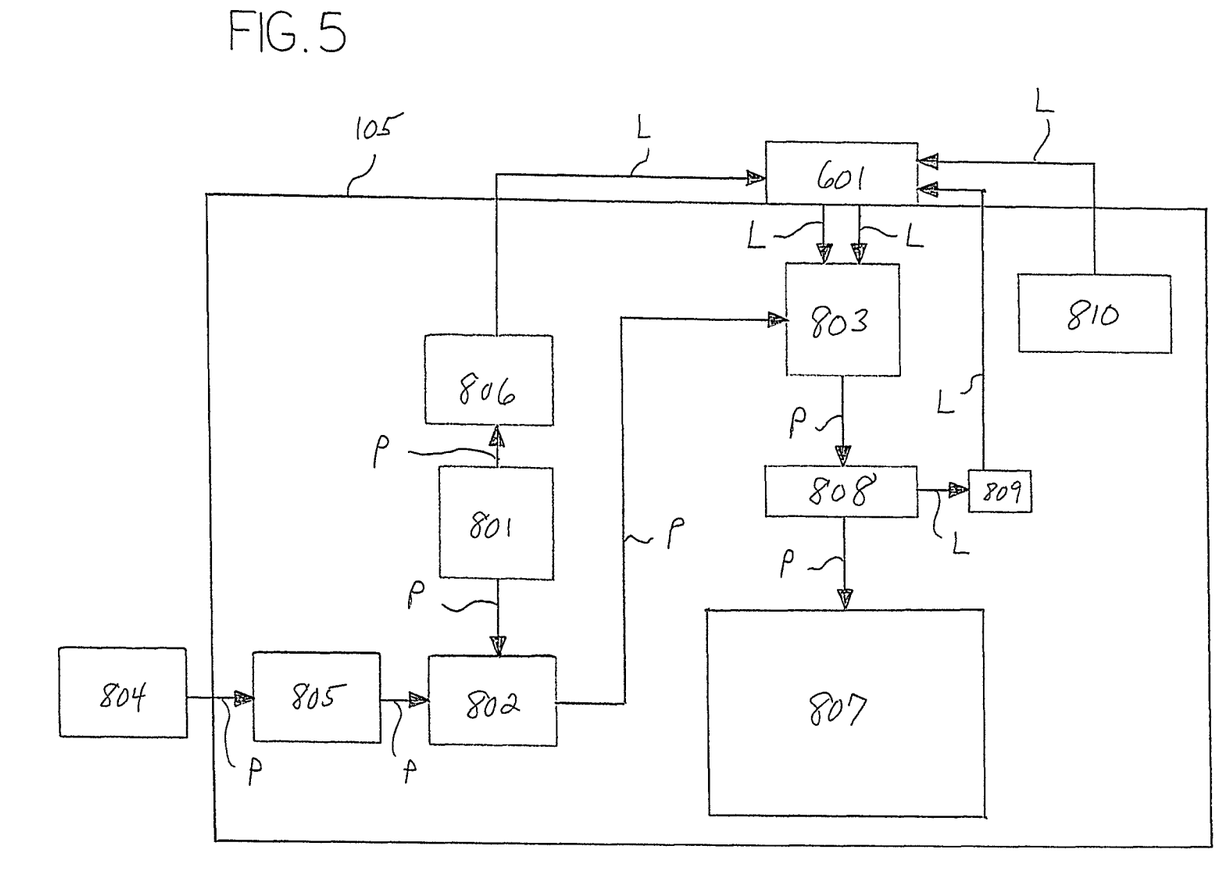
FIG. 5 illustrates an alternative embodiment of a utilities control mechanism.

Another embodiment of a utilities control mechanism 105 adapted to be compatible operationally with the utilities control unit 302 of FIG. 3 is schematically illustrated in FIG. 5, which shows a modified EZ Valve Control Box. Power lines P supply electrical power. Logic lines L include signal transmission lines, general purpose digital input/output lines, a battery flag line, a gas leak flag line and a current limit flag line. In this embodiment, a battery 801 delivers power through a backup power switch relay 802 to a motor controller 803. Alternative power is provided from an exterior AC power source by an AC to DC converter 804 through a DC power regulator 802. A battery charge sensor 806 provides a battery status signal to the utilities control unit 302 through the valve connection interface 601. The motor controller 803 operates the valve actuator 807 in response to receiving an open or close signal from the utilities control unit 302 through the valve connection interface 601. A current sense shunt 808 in communication with a shunt comparator 809 measures the current peak of the motor, which indicates whether the valve has reached the fully open or closed state. Once sensed, a motor signal is sent to the utilities control unit 302 indicating that the motor is to be stopped. In a preferred embodiment, the utilities control mechanism 105 is provided with a gas leak sensor 711 which sends a warning signal to the utilities control unit 302 through the valve connection interface 601. This warning signal may illuminate a visual indicator 610 on the utilities control unit 302, but is preferably relayed to control personnel through the transmitter system 611 of the utilities control unit 302.

Figure 6:
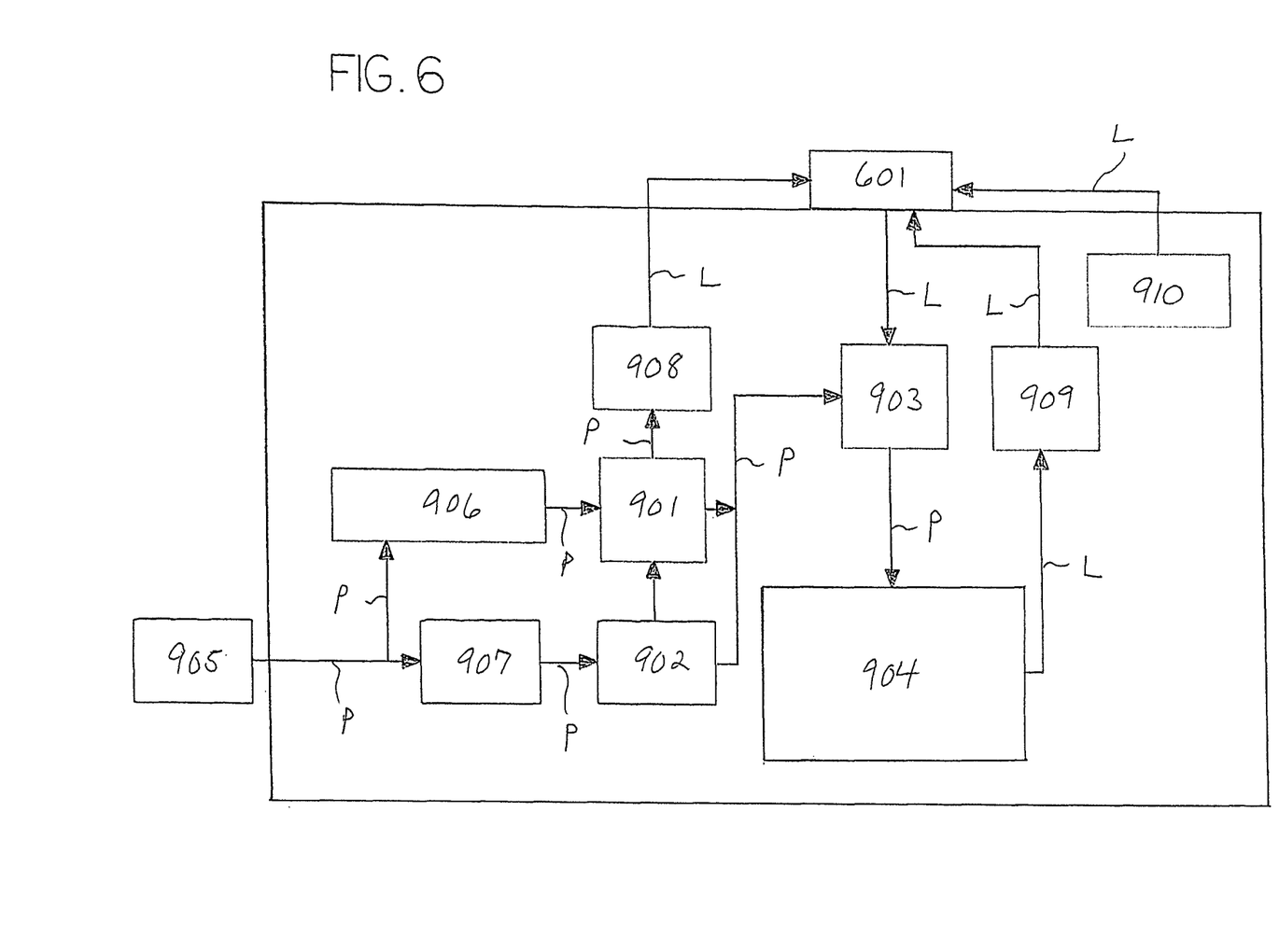
FIG. 6 illustrates still another alternative embodiment of a utilities control mechanism.

Still another embodiment of a utilities control mechanism 105 adapted to be compatible operationally with the utilities control unit 302 of FIG. 3 is schematically illustrated in FIG. 6, which shows a modified Pacific Seismic Control Box. Power lines P supply electrical power. Logic lines L include signal transmission lines, general purpose digital input/output lines, a battery flag line, a gas leak flag line and a valve position flag line. In this embodiment, a battery 901 delivers power through a backup power switch relay 902 to actuator switch 903 and valve actuator 904. The battery 901 is charged by a battery charger 906 receiving power from an exterior AC power source by an AC to DC converter 905, which also provides alternative power through a DC power supply 907 to the backup power switch relay 902. A battery charge sensor 908 provides a battery status signal to the utilities control unit 302 through the valve connection interface 601. The actuator switch 903 operates the valve actuator 904 in response to receiving an open or close signal from the utilities control unit 302 through the valve connection interface 601. A position sense relay 909 provides a valve status signal to the utilities control unit 302 through the valve connection interface 601. In a preferred embodiment, the utilities control mechanism 105 is provided with a gas leak sensor 910 which sends a warning signal to the utilities control unit 302 through the valve connection interface 601. This warning signal may illuminate a visual indicator 610 on the utilities control unit 302, but is preferably relayed to control personnel through the transmitter system 611 of the utilities control unit 302.

Figure 7:
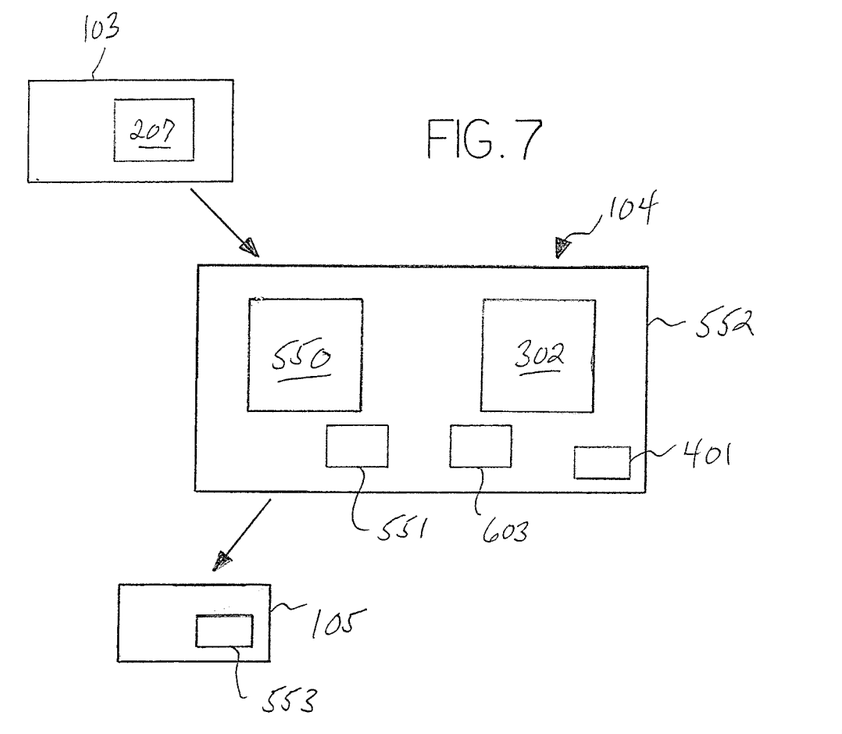
FIG. 7 illustrates the combination of a metering device and utilities control unit wherein the utilities control mechanism is physically separated.
Figure 8:
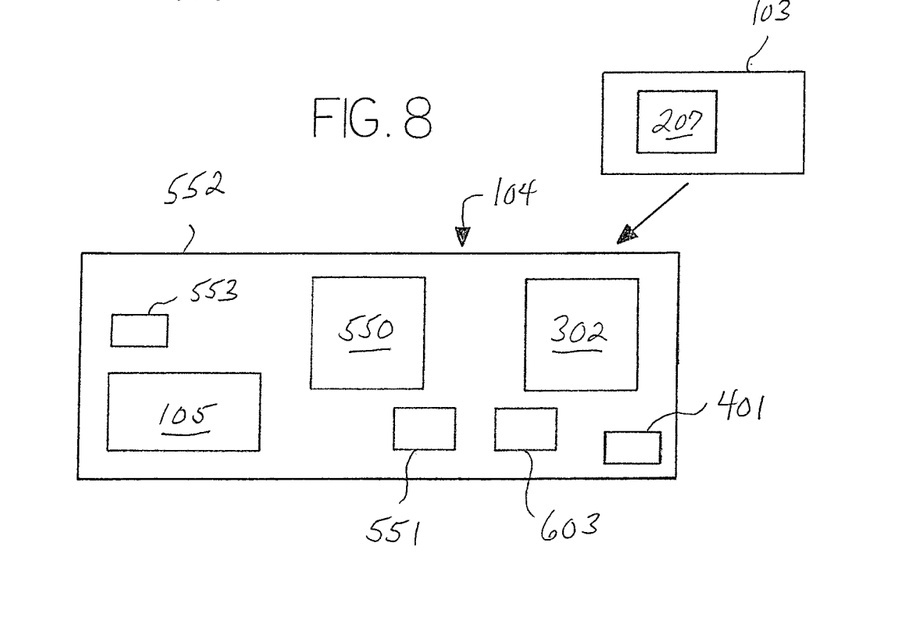
FIG. 8 illustrates the combination of a metering device, utilities control unit and utilities control mechanism disposed within a single housing.

FIGS. 7 and 8 illustrate still other embodiments, wherein the seismic event responsive alert and utilities control system comprises the combination of a utilities control unit 302 and a metering device 550, the metering device 550 being of a type that monitors usage of the utility (water, gas, electricity), the metering device 550 being in communication with the delivery conduit of the utility, and provides the information to the utility provider 207 so that the customer may be billed for its usage. In a simple embodiment, the metering device 550 provides a visual indicator of the usage amount, but many if not most current metering devices 550 are provided with a transmitter or receiver/transmitter device 551 that enables the utility provider 207 to obtain the consumption information remotely. In some instances, the transmission from the metering devices 550 are received with handheld instruments or instruments mounted in vehicles that travel a route covering a large number of metering devices 550. In other instances, the metering devices 550 are capable of transmitting the consumption information to a remote central location operated by the utility provider 207.

In a preferred embodiment, the metering device 550 comprises a housing 552 that physically contains the required equipment to monitor consumption and communicate remotely with the utility provider 207, which in this instance becomes another embodiment of a signal receiver 104 component of the broadcasting system 103. The metering device 550 further comprises a utilities control unit 302, as described previously. The utilities control unit 302 wirelessly receives utilities control signals via a dedicated signal receiving device 603 (from any broadcasting system 103, including the utility provider 207) or alternatively wirelessly via the dedicated receiver/transmitter 551 receiving the signals from the utility provider 207. Upon receipt of the utilities control signal, the utilities control unit 302 actuates the utilities control mechanism 105, which may be remotely located as shown in FIG. 7, and which may also include a leak sensor 553, or the utilities control mechanism 105 may be incorporated within the housing 552 of the metering device 550, as shown in FIG. 8, since the utility must flow through the housing 552 in order to be metered. By providing the utilities control mechanism 105 in direct combination with the metering device 550, the flow of the utility into a structure may be stopped at a single flow point prior to distribution, rather than having to actuate a large number of individual utilities control mechanisms 105 that are all in communication with a single utilities metering device 550. As with other above-described systems, it is preferred that the combined metering device 550 and utilities control unit 302 be provided with a physical vibration sensor 401 to improve the efficiency of the system. Likewise, other elements set forth above in discussion of alternative embodiments of the overall system may be incorporated in this embodiment.

In step-wise fashion, the method at hand comprises as a first step the provision of the described monitors, systems, receivers and control mechanisms in an interconnected seismic event responsive alert and utilities control system, to wit, one or more ground-based physical seismic event monitors 101; one or more satellite-based atmospheric seismic event monitors 102; a broadcasting system 103 comprising one or more of Internet service providers 201, cell phone wireless carriers 202, satellite phone service providers 203, commercial or residential monitoring service providers 204, radio frequency transmitters or stations 205, and public service warning systems 206; signal receivers 104 comprising one or more landline telephones, smartphones, satellite phones, tablets or PC's 301, utilities control units 302, and voice-controlled web communication devices 303; and utilities control mechanisms 105.

In additional steps, the ground-based physical seismic event monitors 101 and satellite-based atmospheric seismic event monitors 102 monitor for seismic effects, and when such seismic effects are detected, initiate an alert protocol to distribute alert and utilities control signals through one or more of the broadcasting systems 103 over one or more communications mediums to one or more of the signal receivers 104, preferably by a plurality of broadcast systems 103 to a plural number of signal receivers 104, some of the signal receivers 104 being a plurality of utilities control units which upon receipt of the utilities control signals actuate a plurality of utilities control mechanisms 105 to stop the flow of utilities through a utilities delivery system.

An embodiment of the method may also comprise the step of providing detection systems 403 and transmission systems 404 in communication with or as components of the utilities control units 302 or utilities control mechanisms 105, whereby the detection systems 403 monitor for dangerous post-seismic event conditions and upon detection of such, the transmission systems 404 transmit such information to various entities, such as utility companies 501, security monitoring service providers 204, facilities operators or control 502 at hospitals, schools, chemical manufacturing plants, etc. The method may further comprise providing an authorization code or similar authorization prior to reopening of the utilities control mechanisms 105 to resume utilities flow.

It is understood and contemplated that equivalents and substitutions of elements, devices, systems and method steps set forth above may be obvious to those skilled in the art, and therefore the true scope and definition of the invention is to be as set forth in the following claims.

I claim:

1. A seismic event responsive alert and utilities control system comprising a ground-based physical seismic event monitoring system adapted to detect physical seismic effects produced by a seismic event, a satellite-based atmospheric seismic event monitoring system, one or more broadcasting systems, one or more utilities control units, one or more utilities metering devices, and one or more utilities control mechanisms;

wherein said physical seismic effects comprise geological, surface and near-surface effects produced by the seismic event, and wherein said atmospheric seismic effects comprise one or more high atmospheric LAI effects which are not detectable by said ground-based physical seismic event monitoring system, said one or more high atmospheric LAI effects chosen from the group of high atmospheric LAI effects consisting of electromagnetic radiation disrupting or altering electromagnetic fields, ionosphere plasma and high-energy particles;

a data analysis processor system adapted to interpret information received from either or both of said ground-based physical seismic event monitoring system and said satellite-based atmospheric seismic event monitoring system, determine the likelihood of potential surface damage resulting from said seismic event within less than proximately two hours, determine the likely region to be adversely affected by the seismic event, and initiate an immediate alert protocol whereby alert and utilities control signals are distributed to said one or more broadcasting systems;

said one or more broadcasting systems adapted to deliver alert and utilities control signals to said one or more utilities control units within the likely region to be adversely affected by the seismic event in response to a seismic event, said one or more utilities control units adapted to control said one or more utilities control mechanisms; said one or more utilities metering devices adapted to monitor utilities usage; and said one or more utilities control mechanisms adapted to stop the flow of utilities, said utilities chosen from the group of utilities consisting of gas, water, electricity, and oil, and wherein said one or more utilities control units and said one or more utilities metering devices are also controlled by communications from a utilities provider;

wherein said on more utilities control units each comprise one or more signal receiving devices adapted to receive said alert and utilities control signals from said one or ore broadcasting systems and a central processing unit module in communication with said one or more signal receiving devices and said one or more utilities control mechanisms, said one or more utilities control units further comprising a physical vibration sensor in communication with said central processing unit module, such that upon sensing vibrations from a seismic event, said physical vibration sensor delivers a signal to said central processing unit module, and said central processing unit module initiates an actuation signal to said one or more utilities control mechanisms, thereby stopping the flow of utilities;

wherein each of said one or more utilities metering devices comprise a housing and a transmitter/receiver device wireless communication with said utilities provider, and wherein each of said one or more utilities control units are disposed within said one or ore utilities metering housings; and further wherein said one or more utilities control mechanisms are disposed apart front said one or more utilities metering housings;

such that upon receipt of said alert and utilities control signals said one or more signal receiving devices communicate said alert and utilities control signal to said central processing unit module, and said central processing unit module initiates an actuation signal to said one or more utilities control mechanisms, thereby stopping the flow of utilities.

2. The system of claim 1, further comprising a valve connection interface, said valve connection interface being in communication with said central processing unit module and said one or more utilities control mechanisms.

3. The system of claim 1, wherein said utilities provider is a signal receiver adapted to receive said alert and utilities control signals from said one or more broadcasting systems and transmit said alert and utilities control signal to said transmitter/receiver device, and further wherein said utilities control device is in communication with said transmitter/receiver device such that upon receipt of said alert and utilities control signal from said transmitter/receiver device, said utilities control unit initiates said actuation signal to said one or more utilities control mechanisms.

4. The system of claim 1, further comprising a valve connection interface, said valve connection interface being in communication with said central processing unit module and said one or more utilities control mechanisms;
   each said one or more utilities control units further comprising a battery adapted to provide power to each said one or more utilities control units;
   each said one or more utilities control units further comprising one or more visual indicators;
   each said one or more utilities control units further comprising a transmitter device in communication with said central processing unit module, said transmitter device adapted to deliver status and other information to receivers; and
   wherein said one or more signal receiving devices are adapted to receive one or ore radio frequency signals, cell phone signals, Internet signals and Bluetooth signals.

5. The system of claim 1, said one or more utilities control mechanisms further comprising:
   a gas leak sensor in communication with said one or more utilities control units, said gas leak sensor adapted to provide a signal to said one or more utilities control units when a gas leak is detected.

6. The system of claim 4, said one or ore utilities control mechanisms further comprising:
   a gas leak sensor in communication with said one or more utilities control units, said gas leak sensor adapted to provide a signal to said one or more utilities control units when a gas leak is detected.

7. The system of claim 1, said one or more utilities control mechanisms further comprising:
   a valve actuator adapted to close a valve to stop the flow of utilities;
   whereby upon receipt of said actuation signal from said utilities control said valve actuator stops the flow of utilities.

8. The system of claim 7, said one or more utilities control mechanisms further comprising:
   an actuator control relay in communication with said one or more utilities control unit and said valve actuator; and
   a valve status sensor system adapted to provide a valve status signal to said one or more utilities control units.

9. The system of claim 7, said one or more utilities control mechanisms further comprising:
   a motor controller adapted to operate said valve actuator; and
   a current sense shunt and shunt comparator adapted to measure the current peak in said motor controller and provide a motor signal to said one or more utilities control units.

10. The system of claim 7, said one or more utilities control mechanisms further comprising:
    an actuator switch in communication with said one or more utilities control nit and said valve actuator; and
    a position sense relay in communication with said valve actuator and said one or more utilities control units.

11. The system of claim 1, wherein said one or more utilities control units is adapted to also receive said alert and utilities control signals from said utilities metering devices transmitter/receiver devices in wireless communication with a utilities provider.

12. The system of claim 5, wherein said one or more utilities control units is adapted to also receive said alert and utilities control signals from said utilities metering devices transmitter/receiver devices in wireless communication with a utilities provider.

\* \* \* \* \*